(12) United States Patent
Höbing et al.

(10) Patent No.: US 12,473,948 B2
(45) Date of Patent: Nov. 18, 2025

(54) LUBRICANT TRANSFER ARRANGEMENT FOR A LUBRICANT SUPPLY OF A TRANSMISSION

(71) Applicant: Flender GmbH, Bucholt (DE)

(72) Inventors: Mathias Höbing, Bocholt (DE); Robert Prusak, Bocholt (DE)

(73) Assignee: Flender GmbH, Bocholt (DE)

( * ) Notice: Subject to any disclaimer, the term of this patent is extended or adjusted under 35 U.S.C. 154(b) by 0 days.

(21) Appl. No.: 19/099,289

(22) PCT Filed: Aug. 1, 2023

(86) PCT No.: PCT/EP2023/071253
§ 371 (c)(1),
(2) Date: Jan. 28, 2025

(87) PCT Pub. No.: WO2024/041854
PCT Pub. Date: Feb. 29, 2024

(65) Prior Publication Data
US 2025/0257762 A1 Aug. 14, 2025

(30) Foreign Application Priority Data
Aug. 23, 2022 (EP) ..................................... 22191614

(51) Int. Cl.
*F16H 57/04* (2010.01)
*F16C 33/10* (2006.01)

(52) U.S. Cl.
CPC ...... *F16C 33/1055* (2013.01); *F16C 33/1065* (2013.01); *F16H 57/0426* (2013.01); *F16H 57/0471* (2013.01)

(58) Field of Classification Search
CPC .............. F16C 33/1055; F16C 33/1065; F16H 57/0426; F16H 57/0471
See application file for complete search history.

(56) References Cited

U.S. PATENT DOCUMENTS

| 4,858,962 A | 8/1989 | Bölling et al. |
| 2017/0356493 A1 | 12/2017 | Kruhoffer et al. |

(Continued)

FOREIGN PATENT DOCUMENTS

| DE | 195 48 756 | 8/1997 |
| DE | 102007057608 | 6/2009 |

(Continued)

OTHER PUBLICATIONS

International Search Report issued by the European Patent Office on Nov. 3, 2023 in International Application PCT/EP2023/071253.

*Primary Examiner* — Tisha D Lewis
(74) *Attorney, Agent, or Firm* — Henry M. Feiereisen LLC

(57) ABSTRACT

A lubricant transfer arrangement for a lubricant supply for a transmission includes an outer transmission component, an inner transmission component rotatable relative to the outer transmission component and a plain bearing supporting the outer transmission component on the inner transmission component. A lubricant pocket is formed between the outer transmission component or the inner transmission component and the plain bearing, and a lubricant channel is designed to lead through the outer transmission component, the plain bearing and the inner transmission component to supply a transmission element to be lubricated provided at a downstream end of the lubricant channel. The lubricant channel runs past the lubricant pocket. A leakage groove is formed between the outer transmission component or the inner transmission component and the plain bearing to fluidically connect the lubricant channel to the lubricant pocket.

19 Claims, 2 Drawing Sheets

(56) References Cited

U.S. PATENT DOCUMENTS

Figure 3:
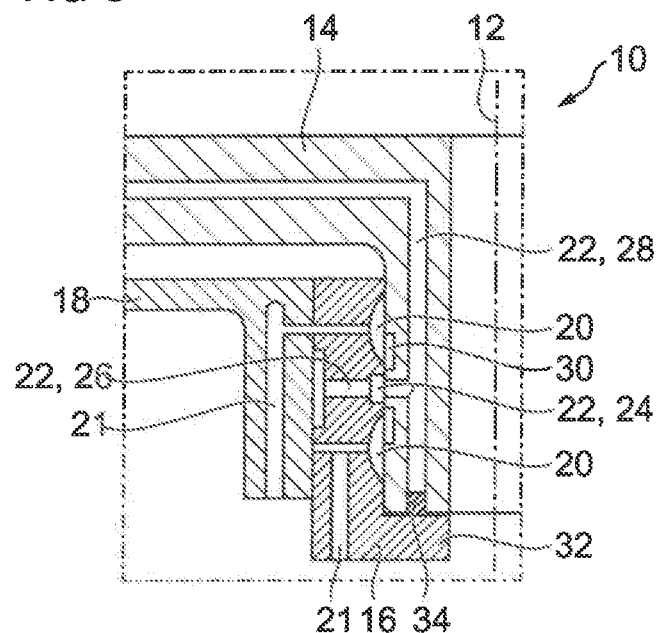

| | | |
|---|---|---|
| 2019/0249711 A1 | 8/2019 | Amano et al. |
| 2021/0095755 A1 | 4/2021 | Haake et al. |
| 2023/0065946 A1 * | 3/2023 | Uhkötter ............... F16C 33/105 |

FOREIGN PATENT DOCUMENTS

| | | | |
|---|---|---|---|
| DE | 102019212444 | 2/2021 | |
| EP | 3290725 A1 * | 3/2018 | .......... F16C 33/1065 |
| EP | 3 406 941 | 11/2018 | |
| EP | 3 798 470 | 3/2021 | |
| WO | WO-2018059982 A1 * | 4/2018 | ............. F03D 15/00 |

\* cited by examiner

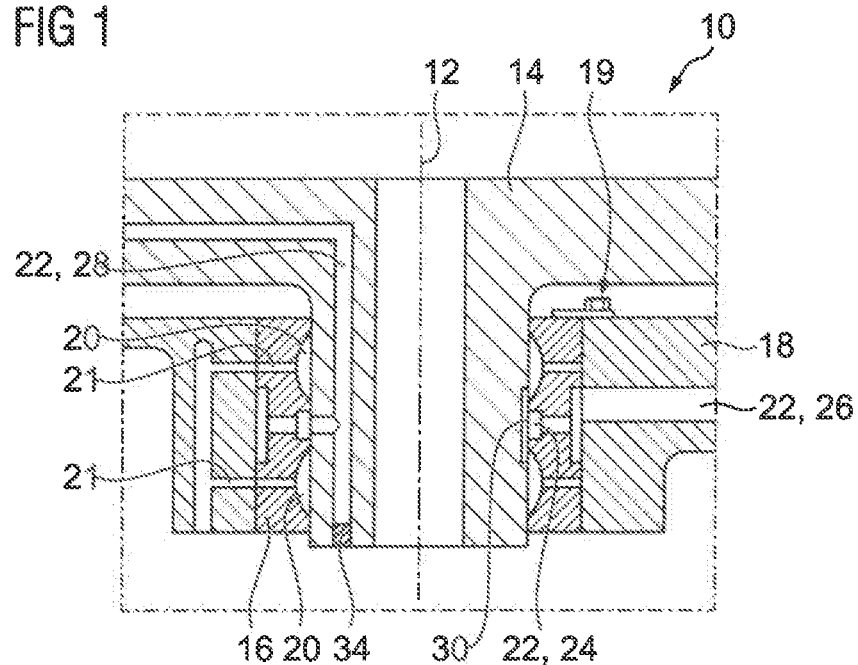
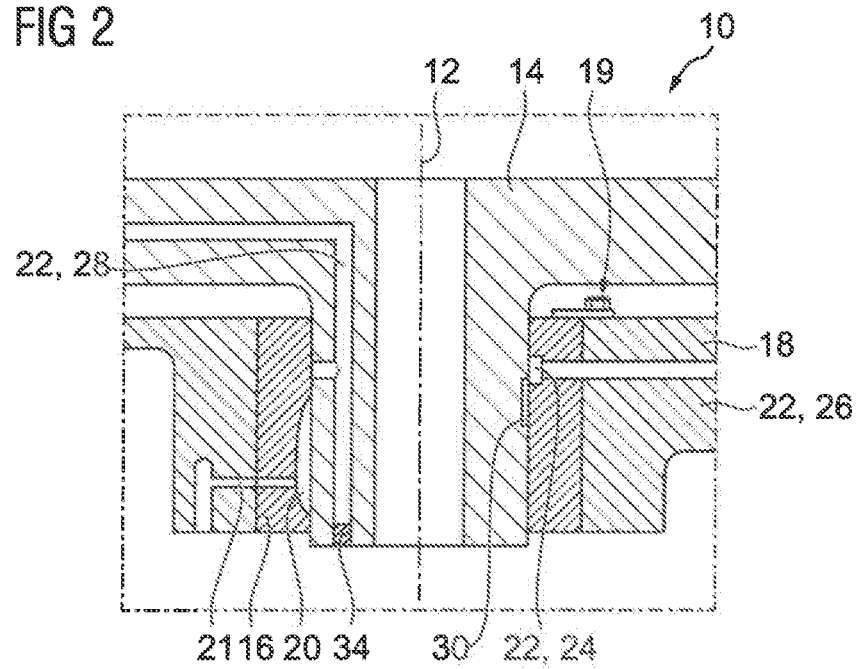

LUBRICANT TRANSFER ARRANGEMENT FOR A LUBRICANT SUPPLY OF A TRANSMISSION

The invention relates to a lubricant transfer arrangement, by means of which a lubricant supply for a transmission can be effected through two transmission components which are mounted against one another so as to be rotatable relative to one another.

EP 3 798 470 A1 discloses a lubricant transfer arrangement for a lubricant supply for a transmission, in which a supply channel radially outwardly branches off from an annular gap of a double-walled tube and leads through a bronze bushing plugged onto the double-walled tube to a discharge channel which leads to a lubricating point, wherein the bushing is provided between a rolling bearing/plain bearing combination supporting the double-walled tube.

From US 2017/0356493 A1 it is to fixedly connect a plain bearing for supporting a planet gear with a fixed planet pin fastened in a planet carrier of a planetary transmission, wherein the planet gear pin is in the form of a hollow shaft with a radially extending supply channel. The supply channel passes radially through the plain bearing and ends in a lubricant pocket formed in the plain bearing. In addition, a groove is formed axially between the plain bearing and the planet pin in order to be able to feed part of the lubricating oil fed via the planet pin to axial plain bearings.

DE 195 48 756 A1 discloses a lubricating oil transfer arrangement, in which a plain bearing is fastened so as to be fixed against movement in a fixed bearing support in order to form a radial plain bearing for a rotating shaft. An oil feed line and an oil pocket axially projecting from the oil feed line are formed in the bearing support in order to apply lubricating oil to bores, which are axially spaced apart from each other, of the plain bearing from the rear side of said plain bearing. The rotating shaft has an annular groove radially opposite the oil feed line and the associated bore in the plain bearing in order to be able to receive the lubricating oil fed from the oil feed line. A bearing gap of the radial plain bearing can be lubricated with lubricating oil from different radial directions via the annular groove and the bore which is at an axial spacing from the annular groove of the lubricant transfer and is supplied with lubricating oil via the oil pocket.

There is a constant need for a lubricant supply for transmission elements to be lubricated in a transmission to be provided as cost-effectively and reliably as possible.

The object of the invention is to demonstrate measures that enable a cost-effective and reliable lubricant supply for a transmission.

The object is achieved by means of a lubricant transfer arrangement having the features of claim 1, a vertical transmission having the features of claim 12, an industrial application having the features of claim 14 and a data agglomerate having the features of claim 15. Preferred refinements are specified in the dependent claims and the description below, which can each represent an aspect of the invention individually or in combination. If a feature is presented in combination with another feature, this serves only for simplified presentation of the invention and is in no way intended to mean that this feature cannot also be a refinement of the invention without the other feature.

One aspect of the invention relates to a lubricant transfer arrangement for a lubricant supply for a transmission, comprising an outer transmission component, an inner transmission component which is rotatable relative to the outer transmission component, a plain bearing for supporting the outer transmission component on the inner transmission component, wherein at least one lubricant pocket is formed between the outer transmission component or the inner transmission component and the plain bearing, wherein a lubricant channel leading through the outer transmission component, the plain bearing and the inner transmission component is designed to supply a transmission element to be lubricated provided at a downstream end of the lubricant channel, wherein the lubricant channel runs past the lubricant pocket, and wherein a leakage groove which fluidically connects the lubricant channel to the lubricant pocket is formed between the outer transmission component or the inner transmission component and the plain bearing.

The outer transmission component is configured, radially with respect to an axis of rotation of the outer transmission component and/or of the inner transmission component, at least in an axial region occupied by the plain bearing, radially outside the inner transmission component. During intended operation, a relative rotation can take place between the outer transmission component and the inner transmission component, which is assisted by the plain bearing. The outer transmission component and the inner transmission component can be arranged coaxially with respect to the axis of rotation. Here, it is possible for both the outer transmission component and the inner transmission component to be rotatable, the respective axes of rotation being substantially coincident with one another. As an alternative, only the outer transmission component or only the inner transmission component is rotatable, whereas the respective other transmission component is designed to be fixed, that is to say non-movable and/or non-rotatable. The fixed transmission component is for example part of a transmission housing and/or of a hub connected so as to be fixed against movement to the transmission housing. The transmission housing can be set down so as to be fixed against movement on an underlying surface, the transmission housing in particular being fastened to the underlying surface.

The plain bearing, which is preferably in the form of a radial plain bearing, can in particular be connected, for example by pressing, for conjoint rotation either to the outer transmission component or to the inner transmission component. In this case, the lubricant pocket may be provided in a plain bearing pairing formed between the plain bearing and the transmission component which is rotatable relative to the plain bearing. The lubricant pocket may be formed exclusively by the plain bearing or exclusively by the transmission component which is rotatable relative to the plain bearing or in one part by the plain bearing and in another part by the transmission component which is rotatable relative to the plain bearing. The lubricant pocket may extend partially circumferentially or completely circumferentially, that is to say in the form of a circumferentially closed annular groove. For example, two or more lubricant pockets are provided at a spacing from one another in the circumferential direction and/or one behind the other in the axial direction. Lubricant, in particular lubricating oil, can accumulate in the region of the lubricant pocket so as to form a, over the extent of the plain bearing in the axial direction and in the circumferential direction, a friction-reducing bearing gap filled with lubricant, in which in particular during intended operation hydrodynamic lubrication develops. The plain bearing may be in the form of a hydrodynamic plain bearing.

The lubricant pocket is in particular in the form of a recess in the material of the plain bearing or of the outer or inner transmission component. As viewed in the axial direction, the lubricant pocket may have a curved, preferably elliptical and/or sickle-shaped, profile in the circumferential direction. The lubricant pocket forms a relatively large free space when it is designed as a clearance fit axially next to the lubricant pocket in the bearing gap of the plain bearing with the relatively rotating transmission component. The lubricant pocket is open in one radial direction toward a lubricating point, in particular toward the bearing gap and/or the leakage groove, and is largely or completely closed in the opposite radial direction. Running away of the lubricant on a rear side facing away from the bearing gap can therefore be avoided or at least minimized. Where appropriate, a channel, the flow cross section of which in the radial direction is considerably smaller than the extent of the lubricant pocket in the axial direction and circumferential direction, may lead into the lubricant pocket on that side of the lubricant pocket which faces away from the lubricating point. The lubricant pocket can preferably be supplied with lubricant mainly or even exclusively via the clearance fit of the bearing gap and the leakage groove. The lubricant pocket is supplied with lubricant in particular substantially through deliberately permitted or deliberately induced leakage effects between the lateral surfaces that rotate relative to one another. This makes it possible for the viscous friction between the lateral surfaces that rotate relative to one another to be used to deliberately convey the lubricant into the lubricant pocket, wherein the leakage groove can enable a considerably higher mass flow from the lubricant channel via the bearing gap and the leakage groove to the lubricant pocket. The lubricant pocket can in particular be generated only by way of an extensively acting machining method, for example milling, such that, as viewed in the axial direction, the lubricant pocket can have the curved, preferably elliptical and/or sickle-shaped, profile in the circumferential direction. Preferably, the lubricant pocket as viewed in the tangential direction, an arcuate, in particular elliptical lubricant pocket as viewed in the axial direction, has the curved, preferably elliptical and/or sickle-shaped, cross section.

The outer transmission component, the plain bearing and the inner transmission component, through which the lubricant channel leads, together simultaneously form a rotary feedthrough for the lubricant of the lubricant channel. However, it is possible to save on separate sealing of the lubricant channel in the region of the bearing gap of the plain bearing pairing, as a result of which production costs, assembly effort and the number of components can be reduced. Instead, a leakage of lubricant from the lubricant channel into the bearing gap may even be deliberately permitted. By means of the leakage groove, it is possible for a certain mass flow of lubricant to be deliberately branched off as leakage flow from the lubricant channel to the at least one lubricant pocket. This can improve the lubrication of the plain bearing and reduce or even completely save on a separate feed of lubricant into the bearing gap and into the lubricant pocket. In particular, the leakage groove leads away substantially at right angles in the axial direction from the lubricant channel which runs substantially radially in the region of the bearing gap, such that there is a preferred flow direction of the lubricant channel along the lubricant channel. Generally, the pressure in the lubricant channel is so high, and the flow speed so low, that a readily controllable static pressure can act at the leakage groove. The flow cross section of the leakage groove can be selected depending on the pressure expected during intended operation and the flow speed expected during intended operation in the lubricant channel in such a way that, in the case of lubricant loss in the bearing gap, lubricant can be automatically replenished from the lubricant channel, but the lubricant coming from the lubricant channel does not unnecessarily displace a lot of lubricant out of the bearing gap and push it out of an axial end of the plain bearing. Leakage out of the lubricant channel into the bearing gap is therefore very low, with the result that the lubrication downstream of the bearing gap of intended transmission components to be lubricated from the lubricant channel is not impaired. At the same time, the lubricant exiting the lubricant channel via the leakage groove is not wasted, but rather is used to assist and improve the plain bearing properties of the bearing arrangement provided by means of the plain bearing. Particularly preferably, the lubricant pocket is supplied with lubricant exclusively by means of the leakage groove, such that a lubricant supply, separate from the lubricant channel, for the lubricant pocket can be saved. Due to the use of the plain bearing arrangement of the transmission components as rotary feedthrough for the lubricant channel, separate sealing can be saved and instead a slight leakage that assists the plain bearing arrangement can be permitted by means of the leakage groove leading to the lubricant pocket, with the result that a cost-effective and reliable lubricant supply for a transmission is enabled.

The leakage groove may be formed exclusively by the plain bearing or exclusively by the transmission component which is rotatable relative to the plain bearing or in one part by the plain bearing and in another part by the transmission component which is rotatable relative to the plain bearing. In comparison to a nominal flow cross section $A_S$ of the lubricant channel, a flow cross section $A_L$ of the leakage groove may for example be $0.01 \leq A_L/A_S \leq 0.50$, in particular $0.02 \leq A_L/A_S \leq 0.25$ and preferably $0.05 \leq A_L/A_S \leq 0.10$. On the radially inner and/or radially outer lateral surface facing toward the plain bearing pairing, the lubricant channel may have a circumferentially closed annular groove, the flow cross section of which is not taken into account when determining the flow cross section $A_S$ of the lubricant channel. Apart from the possibly provided annular groove, the lubricant channel in the outer transmission component, in the plain bearing and in the inner transmission component may be formed by at least one bore, wherein various bores may intersect to form the lubricant channel and/or may be closed at an open end, for example by means of a plug and/or a sealing element.

The leakage groove may extend in a limited circumferential angle range and in the axial direction. The leakage groove may considerably increase the bearing gap provided between the plain bearing and the transmission component which rotates relative to the plain bearing in the very limited circumferential angle range. As a result, the leakage groove may be open toward the relatively rotating component. As viewed in the axial direction, the leakage groove may, for example, have a substantially rectangular, U-shaped cross section, as can for example be generated by means of an end milling cutter. Particularly preferably, the lubricant pocket is formed in the plain bearing, whereas the leakage groove is formed in the inner or outer transmission component which is rotatable relative to the plain bearing. In particular, an annular groove, provided for the transfer of lubricant between the lubricant channel of the plain bearing and the lubricant channel of the relatively rotating transmission component, is also formed in the plain bearing. As a result, the bearing gap can be lubricated with lubricant by the annular groove of the plain bearing and by the lubricant pocket of the plain bearing from the same radial direction, whereas the leakage groove is provided for volume compensation between the lubricant channel or the annular groove and the lubricant pocket.

The lubricant channel does not end in the bearing gap of the plain bearing. Instead, the lubricant channel has a supply channel which comes from a lubricant source and ends in the bearing gap of the plain bearing, and a discharge channel which leads to the transmission element to be lubricated located at the end side and begins in the bearing gap of the plain bearing. If the supply channel is provided in the outer transmission component, the discharge channel is provided in the inner transmission component. If the supply channel is provided in the inner transmission component, the discharge channel is provided in the outer transmission component. The transmission element to be lubricated may, for example, be another bearing arrangement, for example an axial plain bearing for a grinding plate of a vertical mill. Such a vertical mill is for example described in DE 10 2007 057 608 A1, to the contents of which reference is hereby made as part of the invention.

A fluidic connection is understood to mean a connection of parts of a channel and/or of a line that enables a flow of a fluid between the interconnected parts and provides an exchange of pressure and mass in the context of intercommunicating tubes.

During intended operation, the lubricant channel can be filled with a lubricant. The lubricant used can in particular be a natural and/or synthetic lubricating oil. The lubricant can preferably comprise friction-reducing and/or heat-dissipating additives. The lubricant is temperature-resistant in particular up to a temperature of 120° C., the additives contained in the lubricant exhibiting substantially no degeneration in particular up to this temperature.

In particular, a leakage gap height H of the leakage groove in the radial direction is greater than a bearing gap height h between the outer transmission component or the inner transmission component and the plain bearing, wherein in particular $1.01 \leq H/h \leq 2.00$, preferably $1.10 \leq H/h \leq 1.75$ and particularly preferably $1.25 \leq H/h \leq 1.50$. Owing to the selected leakage gap height, an unnecessarily high flow resistance within the leakage groove can be avoided, such that the lubricant pocket can be easily supplied with the lubricant originating from the lubricant channel. The leakage groove may, for example, be designed as a conduit which communicates with the bearing gap over the axial extent of the leakage groove.

Preferably, a connecting channel leading into the lubricant pocket is provided, wherein the connecting channel is fluidically connected to a lubricant source for feeding lubricant into the lubricant pocket and/or to a lubricant drain for discharging lubricant originating from the lubricant channel. The lubricant pocket may be fluidically connected to the lubricant source and/or to the lubricant drain via the connecting channel which is embodied to be completely or at least partially separate from the lubricant channel. If the connecting channel is connected to the lubricant channel, it is possible for lubricant to be conveyed out of the lubricant channel via the leakage groove and the lubricant pocket and from the lubricant pocket via the connecting channel, in particular upstream of the plain bearing, back into the lubricant channel. If the connecting channel is separate from the lubricant channel, that is to say is not connected to the lubricant channel, it is possible to influence the lubrication of the plain bearing irrespective of the flow conditions in the lubricant channel. Particularly when starting up the transmission, it is possible to use the connecting channel to feed lubricant with a comparatively high pressure, in order to form a hydrostatic plain bearing and in particular to reduce resistance moments until a hydrodynamic plain bearing is formed during regular operation.

Particularly preferably, the plain bearing has a radially projecting collar for axial abutment against the outer transmission component or against the inner transmission component. The collar of the plain bearing makes it possible to predefine an axial insertion depth of the plain bearing relative to the outer transmission component and/or to the inner transmission component. This makes it easier to avoid an axial offset of the lubricant channel in the bearing gap. The flow resistance of the lubricant channel in the rotary feedthrough formed at the plain bearing can be minimized as a result. In addition, the collar can easily be used for mechanical fastening of the plain bearing to the outer transmission component or to the inner transmission component, for example by the collar being used as a fastening flange.

In one embodiment, provision is in particular made for the collar to cover, in particular to seal with a pressing force, a closure and/or a sealing element for an axially facing opening in a section of the lubricant channel. In the outer transmission component or in the inner transmission component, there can be introduced through a bore, in particular a blind bore, an axially running part of the lubricant channel that is however intended to be closed at its opening in order to prevent lubricant from escaping and leaking. The closure, in particular a plug, or some other sealing element may be provided for this. The collar, covering the opening, of the plain bearing can already provide sealing in the manner of a labyrinth seal, wherein the collar can further improve the sealing action by virtue of the closure or the sealing element being pressed by the collar.

In a further embodiment, provision is preferably made for the collar to cover an axially facing opening in a section of the lubricant channel and to form a further section of the lubricant channel that communicates with the section. This makes it possible for part of the lubricant channel and/or of the connecting channel to be guided via the collar of the plain bearing. This opens up further structural freedoms for the design of a lubricant supply in the transmission. It is also possible to avoid or reduce a material weakening that may otherwise occur in the outer transmission component and/or in the inner transmission component by the provision of part of the lubricant channel and/or of the connecting channel.

Provision is particularly preferably made for the collar to cover an axially facing opening in a connecting channel which communicates with the lubricant pocket and is formed separately from the lubricant channel, and to form a further connecting channel which communicates with the connecting channel. The connecting channel may be guided via the collar of the plain bearing, such that the connecting channel can easily run at a spacing from the lubricant channel. Mutual interference and/or an unnecessary material weakening in the outer transmission component and/or in the inner transmission component can be avoided as a result.

In one embodiment, in particular at least two lubricant pockets are formed axially one behind the other at least partially in a common circumferential angle range, wherein the lubricant channel is led axially between the two lubricant pockets and the lubricant channel is fluidically connected to the lubricant pockets by way of a respective leakage grooves which lead away in different axial directions from the lubricant channel. The plurality of lubricant pockets makes it possible to suitably predefine the load-bearing capacity and/or the lubrication of the plain bearing. Since the lubricant channel runs axially between two lubricant pockets, it is possible to provide symmetrical ratios for the profile of the leakage grooves in both axial directions, as a result of which a uniform supply of the lubricant pockets with lubricant can be ensured. It is in particular possible for circumferentially offset rows of lubricant pockets arranged axially one behind the other to be provided, wherein leakage grooves can be provided in the respective circumferential angle range for each row of lubricant pockets.

In a further embodiment, provision is preferably made for the leakage groove, in particular only exactly one leakage groove, to lead away from the lubricant channel only in one axial direction, wherein the lubricant pocket, in particular only exactly one lubricant pocket, is formed in particular only in exactly one axial region. The production effort and thus the production costs can be kept low as a result.

Particularly preferably, the leakage groove runs predominantly vertically, wherein in particular at least part of the lubricant from the the lubricant channel is able to be conveyed through the leakage groove in a gravity-assisted manner. The supply of lubricant to the at least one lubricant pocket from the lubricant channel can therefore be effected in a gravity-assisted manner and therefore passively. This makes it possible, in order to provide a desired delivery flow along the leakage groove, to provide a small flow cross section for the leakage groove, as a result of which the load-bearing capacity of the plain bearing can be improved.

In particular, the outer transmission component or the inner transmission component is designed as a fixed transmission housing part. This makes it easier to connect a lubricant source and/or a lubricant drain to the lubricant channel. Unnecessary rotary feedthroughs can be avoided as a result.

A further aspect of the invention relates to a vertical transmission, in particular for operating a vertical mill, comprising a substantially vertically oriented shaft and a lubricant transfer arrangement, which can be formed and developed as described above, wherein the shaft forms the inner transmission component or the outer transmission component. A suitable vertical mill is for example described in DE 10 2007 057 608 A1, to the contents of which reference is hereby made as part of the invention. The vertical transmission and/or the vertical mill formed with the aid of the vertical transmission can in particular be formed and developed as described above. Due to the use of the plain bearing arrangement of the transmission components as rotary feedthrough for the lubricant channel, separate sealing can be saved and instead a slight leakage that assists the plain bearing arrangement can be permitted by means of the leakage groove leading to the lubricant pocket, with the result that a cost-effective and reliable lubricant supply for the vertical transmission and/or the vertical mill is enabled.

Preferably, the shaft is connected for conjoint rotation to a planet carrier of a planetary transmission, wherein in particular a grinding plate of a vertical mill is fastened to the planet carrier. Mounted on the planet carrier may be at least one planet gear, preferably three, five or seven planet gears, which meshes with a sun gear and/or a ring gear. The ring gear is in particular fixed and non-rotatable, wherein the ring gear is preferably fastened in a non-movable manner to a housing part of the vertical transmission and/or of the vertical mill. The sun gear can be fastened to a sun gear shaft which can be driven by a drive motor, preferably by way of at least one interposed transmission ratio stage. The lubricant of the lubricant channel can be guided, in particular via the housing and the lubricant transfer arrangement formed between the housing and the shaft, into the shaft, where the lubricant can be guided along the shaft up to an axial plain bearing supporting the grinding plate.

A further aspect of the invention relates to an industrial application having a transmission, in particular a vertical transmission, which can be formed and developed as described above, wherein the transmission has at least one transmission element to be lubricated and at least one lubricant transfer arrangement, which can be formed and developed as described above, for conveying lubricant to the transmission element to be lubricated. The industrial application can have a drive means which can be designed, for example, as an electric machine, an internal combustion engine, a hydraulic motor or a rotor which is driven by wind power. The drive means can be coupled to a transmission for converting a torque and a rotation speed of the power generated by the drive means, wherein the transmission can be formed and developed as described above. The transmission of the industrial application can, in turn, be coupled in a torque-transmitting manner to a mechanical application in which mechanical energy introduced via the transmission can be used. The mechanical application may also include, for example, a mill, vertical mill, sugar mill, cement mill, rock crusher, conveyor belt, pump, roller press, plate belt, pipe mill, rotary kiln, slewing gear, agitator, lifting device, garbage press, scrap press, shredder for recyclable materials from waste or the like, optionally previously separated and/or sorted. Due to the use of the plain bearing arrangement of the transmission components as rotary feedthrough for the lubricant channel, separate sealing can be saved and instead a slight leakage that assists the plain bearing arrangement can be permitted by means of the leakage groove leading to the lubricant pocket, with the result that a cost-effective and reliable lubricant supply for the industrial application is enabled.

A further aspect of the invention relates to a data agglomerate comprising data packets combined in a common file or distributed among different files for depicting the three-dimensional design and/or the interactions of all the constituent parts provided in the lubricant transfer arrangement, which can be formed and developed as described above, wherein the data packets are prepared, during processing by a data processing device, to carry out additive manufacturing of the constituent parts of the lubricant transfer arrangement, in particular by 3D printing, and/or a simulation of the functioning of the lubricant transfer arrangement. The data agglomerate can represent a virtual embodiment of the respective apparatus, in particular the above-described lubricant transfer arrangement, of the vertical transmission and/or of the vertical mill in the manner of what is referred to as a "digital twin", which allows a virtual investigation in the form of a simulation or a real objectification by means of an additive manufacturing method. In particular, a data packet can in each case represent a separately executed constituent part of the respective associated apparatus, and therefore the individual constituent parts can be easily actually and/or virtually assembled in their relative position and/or relative movability to realize the interactions that are essential to the invention. This enables cost-effective production of prototypes and/or a cost-effective computer-based simulation to study the functioning of the lubricant transfer arrangement, of the vertical transmission and/or of the vertical mill, identify problems in the specific application and find improvements. Due to the use of the plain bearing arrangement of the transmission components as rotary feedthrough for the lubricant channel, separate sealing can be saved and instead a slight leakage that assists the plain bearing arrangement can be permitted by means of the leakage groove leading to the lubricant pocket, with the result that a cost-effective and reliable lubricant supply is enabled, which can be easily and cost-effectively investigated by means of the data agglomerate.

Figure 4:
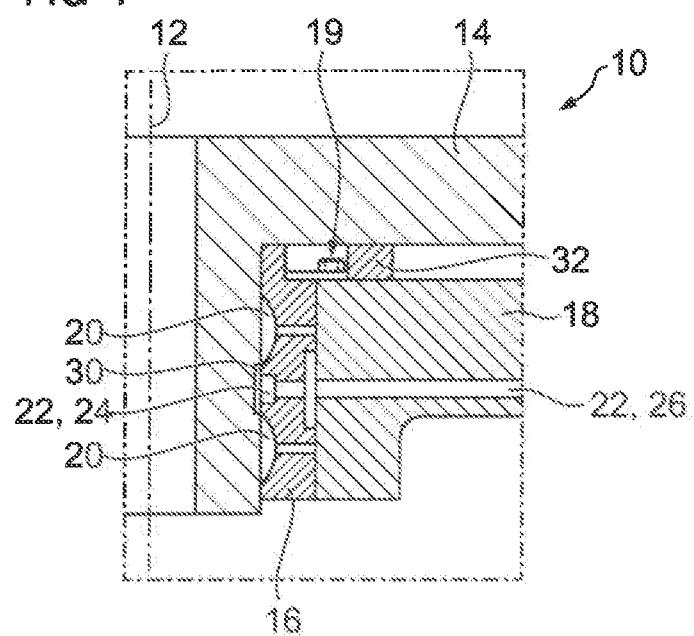

The invention will be explained below by way of example with reference to the accompanying drawings using preferred exemplary embodiments, wherein the features presented below can each represent an aspect of the invention both individually and in combination. In the drawings:

FIG. 1 shows a schematic sectional view of a first embodiment of a lubricant transfer arrangement, FIG. 2 shows a schematic sectional view of a second embodiment of a lubricant transfer arrangement, FIG. 3 shows a schematic sectional view of a third embodiment of a lubricant transfer arrangement, and FIG. 4 shows a schematic sectional view of a fourth embodiment of a lubricant transfer arrangement.

The lubricant transfer arrangement 10 illustrated in FIG. 1 can be part of a vertical transmission for a vertical mill and has, in the illustrated exemplary embodiment, a vertically oriented axis of rotation 12 about which an inner transmission component 14 can rotate. The inner transmission component 14 is for example designed as a planet carrier of a planetary transmission, wherein the planet carrier can be connected for conjoint rotation to a grinding plate (not illustrated) of the vertical mill. The grinding plate can be mounted and supported in an axial plain bearing to be lubricated. The inner transmission component 14 is mounted in an outer transmission component 18 by way of a plain bearing 16. In the illustrated exemplary embodiment, the plain bearing 16, designed as a radial plain bearing, is fixedly connected to, for example pressed into and/or mechanically fastened via a screw arrangement 19 to, the outer transmission component 18. However, it is also possible for the plain bearing 16 to be fixedly connected to the inner transmission component 14 and to undergo a rotation relative to the outer transmission component 18. The outer transmission component 18 is in particular part of a fixed transmission housing to which a ring gear (not illustrated) of the planetary transmission is preferably connected so as to be fixed against movement. Planet gears (not illustrated) can mesh with the ring gear and a sun gear (not illustrated) of a sun gear shaft (not illustrated), wherein the sun gear shaft can be driven by a drive motor, preferably by way of at least one transmission ratio stage designed as a spur-gear stage and/or as a bevel-gear stage.

Lubricant pockets 20, which are illustrated in exaggerated form for reasons of better illustration, are formed in a bearing gap between the plain bearing 16 and the inner transmission component 14. In the illustrated exemplary embodiment, the lubricant pockets 20 are formed exclusively in the plain bearing 16, it also being possible for at least one or all of the lubricant pockets 20 to additionally or alternatively be formed by the inner transmission component 14. In the illustrated exemplary embodiment, the lubricant pockets can be supplied with lubricant via connecting channels 21, the connecting channels extending through the plain bearing 16 and the outer transmission component 18. However, it is alternatively also possible for the connecting channels 21 to be omitted, such that the lubricant pockets 20 are supplied with lubricant, in particular lubricating oil, exclusively via the bearing gap and the leakage groove 30.

In order to supply a transmission element to be lubricated, for example the axial plain bearing for the grinding plate, with lubricant downstream of the lubricant transfer arrangement 10, a lubricant channel 22 is provided which has a supply channel 26 running through the outer transmission component 18, the plain bearing 16 and an annular groove 24 formed in the plain bearing 16, and a discharge channel 28 which communicates with a bearing gap between the plain bearing 16 and the inner transmission component 14 and is formed in the inner transmission component 14.

In principle, the lubricant channel 22 can be formed independently and separately from the lubricant pockets 20 and the associated connecting channels 21. However, in the present embodiment, a leakage groove 30 is provided, via which the lubricant channel 22 can fluidically communicate with the lubricant pockets 20, in addition to the bearing gap of the plain bearing 16, with a greater flow cross section than the bearing gap of the plain bearing 16. This makes it possible for the lubricant pockets 20 to be supplied with lubricant branched off from the lubricant channel 20, making it possible for the lubricant supply for the lubricant pockets 20 via the connecting channels 21 to be of smaller dimensions or to even be completely omitted. In the embodiment illustrated in FIG. 1, the supply channel 26 of the lubricant channel 22 leads axially between the lubricant pockets 20 into the bearing gap of the plain bearing 16, such that the leakage groove 30 communicating with a respective lubricant pocket 20 is provided in both axial directions. In the illustrated exemplary embodiment, the leakage groove 30 is formed exclusively by the inner transmission component 14, it also being possible for the leakage groove 30 to additionally or alternatively be formed by the plain bearing 16.

In the embodiment of the lubricant transfer arrangement 10 illustrated in FIG. 2, in comparison to the embodiment of the lubricant transfer arrangement 10 illustrated in FIG. 1, only one lubricant pocket 20 is formed in the axial direction. The supply channel 26 of the lubricant channel 22 can lead above the lubricant pocket 20 into the bearing gap of the plain bearing 16, such that the lubricant pocket 20 can be supplied with lubricant from the lubricant channel 22 via the leakage groove 30 in a gravity-assisted manner.

In the embodiment of the lubricant transfer arrangement 10 illustrated in FIG. 3, in comparison to the embodiment of the lubricant transfer arrangement 10 illustrated in FIG. 1, the plain bearing 16 is provided with a collar 32 which axially bears against the inner transmission component 14, radially inwardly projects from the rest of the plain bearing 16 and delimits an axial insertion depth of the plain bearing 16 on the inner transmission component 14. At the same time, the collar 32 can push against a closure 34, designed as a plug, for the axially running part of the discharge channel 28 of the lubricant channel 22 and improve the sealing action as a result. As an alternative, the rotary feedthrough between the supply channel 26 and the discharge channel 28 of the lubricant channel 22 may be formed axially on the end side between the collar 32 and a non-closed opening in the discharge channel 28 that faces toward the collar 32. In addition or as an alternative, an in particular axially running part of the connecting channel 21 leading to the lubricant pocket 20 may also be formed in the plain bearing 16, wherein the connecting channel 21 formed in the plain bearing 16 may be formed at least partially in the collar 32 and/or in that part of the plain bearing 16 which differs from the collar 32. In particular, the connecting channel 21 is branched off from the supply channel 26, preferably within the plain bearing 16. However, it is alternatively also possible for the connecting channels 21 to be omitted, such that the lubricant pockets 20 are supplied with lubricant, in particular lubricating oil, exclusively via the bearing gap and the leakage groove 30.

In the embodiment of the lubricant transfer arrangement 10 illustrated in FIG. 4, In comparison to the embodiment of the lubricant transfer arrangement 10 illustrated in FIG. 1, the plain bearing 16 is provided with a collar 32 which axially bears against the outer transmission component 18, radially outwardly projects from the rest of the plain bearing 16 and delimits an axial insertion depth of the plain bearing 16 on the outer transmission component 18. Analogously to the design of the lubricant transfer arrangement 10 described with reference to FIG. 3, the collar 32 can push against a closure, designed as a plug, for the axially running part of the supply channel 26 of the lubricant channel 22 and Improve the sealing action as a result. As an alternative, the lubricant transfer of the supply channel 26 of the lubricant channel 22 between the plain bearing 16 and the outer transmission component 18 may be formed axially on the end side between the collar 32 and a non-closed opening in the outer transmission component 18 that faces toward the collar 32.

The invention claimed is:

1. A lubricant transfer arrangement for a lubricant supply for a transmission, the lubricant transfer arrangement comprising:
    an outer transmission component;
    an inner transmission component rotatable relative to the outer transmission component;
    a plain bearing supporting the outer transmission component on the inner transmission component;
    a lubricant pocket formed between the outer transmission component or the inner transmission component and the plain bearing;
    a lubricant channel designed to lead through the outer transmission component, the plain bearing and the inner transmission component to supply a transmission element to be lubricated provided at a downstream end of the lubricant channel, said lubricant channel running past the lubricant pocket; and
    a leakage groove formed between the outer transmission component or the inner transmission component and the plain bearing to fluidically connect the lubricant channel to the lubricant pocket.

2. The lubricant transfer arrangement of claim 1, wherein the leakage groove has in a radial direction a leakage gap height which is greater than a bearing gap height between the outer transmission component or the inner transmission component and the plain bearing.

3. The lubricant transfer arrangement of claim 1, further comprising a connecting channel leading into the lubricant pocket and fluidically connected to a lubricant source for feeding lubricant into the lubricant pocket and/or to a lubricant drain for discharging lubricant originating from the lubricant channel.

4. The lubricant transfer arrangement of claim 1, wherein the plain bearing comprises a radially projecting collar for axial abutment against the outer transmission component or against the inner transmission component.

5. The lubricant transfer arrangement of claim 4, wherein the collar covers a closure and/or a sealing element for an axially facing opening in a section of the lubricant channel.

6. The lubricant transfer arrangement of claim 4, wherein the collar covers an axially facing opening in a section of the lubricant channel and forms a further section of the lubricant channel that communicates with the section.

7. The lubricant transfer arrangement of claim 4, wherein the collar covers an axially facing opening in a connecting channel which communicates with the lubricant pocket and is formed separately from the lubricant channel, said collar forming a further connecting channel which communicates with the connecting channel.

8. The lubricant transfer arrangement of claim 1, further comprising:
    at least two of said lubricant pocket which are formed axially one behind the other, said lubricant channel being led axially between the at least two lubricant pockets; and
    at least two of said leakage groove designed to lead away in different axial directions from the lubricant channel, said lubricant channel being fluidically connected to the at least two lubricant pockets via the at least two leakage grooves, respectively.

9. The lubricant transfer arrangement of claim 1, wherein the leakage groove, leads away from the lubricant channel only in one axial direction, said lubricant pocket, being formed in particular only in exactly one axial region.

10. The lubricant transfer arrangement of claim 1, wherein the leakage groove runs predominantly vertically.

11. The lubricant transfer arrangement of claim 1, wherein the outer transmission component or the inner transmission component is designed as a fixed transmission housing part.

12. A vertical transmission, comprising:
    a lubricant transfer arrangement comprising an outer transmission component, an inner transmission component rotatable relative to the outer transmission component, a plain bearing supporting the outer transmission component on the inner transmission component, a lubricant pocket formed between the outer transmission component or the Inner transmission component and the plain bearing, a lubricant channel designed to lead through the outer transmission component, the plain bearing and the inner transmission component to supply a transmission element to be lubricated provided at a downstream end of the lubricant channel, said lubricant channel running past the lubricant pocket, and a leakage groove formed between the outer transmission component or the inner transmission component and the plain bearing to fluidically connect the lubricant channel to the lubricant pocket; and
    a substantially vertically oriented shaft forming the inner transmission component or the outer transmission component of the lubricant transfer arrangement.

13. The vertical transmission of claim 12, wherein the shaft is connected for conjoint rotation to a planet carrier of a planetary transmission.

14. An industrial application, comprising a transmission, said transmission comprising a transmission element to be lubricated and a lubricant transfer arrangement for conveying lubricant to the transmission element, said lubricant transfer arrangement comprising an outer transmission component, an inner transmission component rotatable relative to the outer transmission component, a plain bearing supporting the outer transmission component on the inner transmission component; a lubricant pocket formed between the outer transmission component or the inner transmission component and the plain bearing; a lubricant channel designed to lead through the outer transmission component, the plain bearing and the inner transmission component to supply the transmission element provided at a downstream end of the lubricant channel, said lubricant channel running past the lubricant pocket, and a leakage groove formed between the outer transmission component or the inner transmission component and the plain bearing to fluidically connect the lubricant channel to the lubricant pocket.

15. A data agglomerate, comprising data packets combined in a common file or distributed among different files for depicting a three-dimensional design and/or interactions of all constituent parts comprising the lubricant transfer arrangement of claim 1, said data packets being stored on a non-transitory computer-readable data storage medium so as to carry out, during processing by a data processing device, additive manufacturing of the constituent parts of the lubricant transfer arrangement, in particular by 3D printing, and/or a simulation of the functioning of the lubricant transfer arrangement.

16. The lubricant transfer arrangement of claim 2, wherein the bearing gap height between the outer transmission component or the inner transmission component and the plain bearing is $1.01 \leq H/h \leq 2.00$, with H being the leakage gap height and h being the bearing gap height.

17. The lubricant transfer arrangement of claim 2, wherein the bearing gap height between the outer transmission component or the inner transmission component and the plain bearing is $1.10 \leq H/h \leq 1.75$, with H being the leakage gap height and h being the bearing gap height.

18. The lubricant transfer arrangement of claim 2, wherein the bearing gap height between the outer transmission component or the inner transmission component and the plain bearing is $1.25 \leq H/h \leq 1.50$, with H being the leakage gap height and h being the bearing gap height.

19. The lubricant transfer arrangement of claim 10, wherein at least part of the lubricant from the lubricant channel is conveyable through the leakage groove in a gravity-assisted manner.

* * * * *